Feb. 9, 1965 K. CHVATLINSKY 3,168,839
ROTARY COUPLING ARRANGEMENT
Filed Nov. 27, 1961 2 Sheets-Sheet 2

INVENTOR
Kurt Chvatlinsky
by:
Michael S. Striker
Attorney

United States Patent Office 3,168,839
Patented Feb. 9, 1965

3,168,839
ROTARY COUPLING ARRANGEMENT
Kurt Chvatlinsky, Wilhelmshaven, Germany, assignor to Olympia Werke AG., Wilhelmshaven, Germany
Filed Nov. 27, 1961, Ser. No. 155,105
Claims priority, application Germany, Nov. 28, 1960,
O 7,741
19 Claims. (Cl. 74—435)

The present invention relates to a rotary coupling arrangement, and more particularly to a coupling arrangement in which a toothed continuously rotating drive means can be coupled to a driven means to rotate the same a single revolution.

This type of rotary coupling arrangement is advantageously used for electric typewriters and similar business machines for the purpose of actuating the type lever actions, the shifting of the carriage or type levers between an upper case position and a lower case position, and for similar functions requiring the actuation of a member to rapidly perform a function while being temporarily coupled to a rotary drive means, such as the power roll of an electric typewriter.

Difficulties are encountered in coupling arrangements of this type by the fact that the driven means may be shifted into engagement with the drive means in such a position that the tips of teeth of the drive means and of the driven means abut each other, preventing a proper meshing engagement between the driving teeth and driven teeth. Such improper engagement may not only result in a malfunctioning of the coupling arrangement but also leads to damage to the teeth, or at least to excessive wear on the teeth. Another disadvantage is the noisy operation of coupling arrangements of this type.

It is one object of the present invention to overcome the disadvantages of the prior art constructions, and to provide a rotary coupling arrangement which quietly and reliably operates, and in which an engagement between the tips of two teeth will not result in wear or damage to the teeth.

Another object of the present invention is to provide a rotary coupling engagement which is particularly suited for electric typewriters and business machines incorporating a toothed power roll.

Another object of the present invention is to provide a rotary coupling arrangement for driving a driven member a single revolution upon actuation.

Another object of the present invention is to provide a coupling arrangement in which the driven member is provided with resiliently deformable teeth so that if the tip of one tooth is engaged and deformed, the next following tooth is deformed therewith to assume a position in which meshing is assured.

Another object of the present invention is to provide a rotary coupling arrangement in which a driven member turns through 180° when an operating key is depressed, and turns through another 180° when the operating key is released.

Another object of the present invention is to provide a toothed coupling member which consists of a resilient material, and to reinforce the resilient toothed member by metal teeth which become operative only upon extreme deformation of the resilient teeth.

With these objects in view, one rotary coupling arrangement according to the present invention comprises a rotary drive means having an annular peripheral set of first teeth, a rotary driven means having an annular peripheral portion including a set of second teeth and at least one recess so that the set of second teeth is interrupted as if one or two second teeth were missing, and operating means, which may include a manually operated key, for turning the driven means through a small angular distance.

The rotary drive means and the rotary driven means are spaced from each other and arranged and constructed in such a manner that in an inoperative angular position of the driven means, the teeth of the drive means are located in the recess without meshing with the teeth of the driven means so that the driven means is not coupled to the drive means. In other angular positions of the driven means its teeth mesh with the teeth of the drive means, and consequently the driven means is coupled to the drive means and rotated by the same.

The operating means are used for turning the driven means out of the inoperative position so that the teeth of the drive means engage the teeth of the driven means following the recess in the direction of rotation of the driven means, and turn the driven means until the same arrives again in the inoperative position in which the teeth of the drive means are located in the recess. By this arrangement a single revolution of the driven means is obtained whenever the same is coupled to the drive means. If two recesses are provided in the peripheral portion of the driven means and spaced 180°, the coupling arrangement will have two inoperative positions, and in accordance with a preferred embodiment of the invention, the operating key effects upon depression rotation of the driven means by the drive means through 180°, and completion of the single revolution of the driven means when being released for return to its normal position.

In the preferred embodiment of the invention, the driven means and its teeth are made of a flexible resilient material, and a cutout is provided inwardly of the pair of teeth directly following the recess in the direction of rotation. The arrangement is such that if the tip of the first tooth directly following a recess is engaged by the tip of a tooth of the driving means so that the respective tooth of the driven means is pushed inwardly which is facilitated by the cutout, the respective part of the peripheral portion of the driven means is deformed in such a manner that the second tooth of the pair is outwardly pressed and slightly displaced so that its tip is no longer located opposite the tip of a tooth of the drive means. In this manner, the second tooth passes into the space between two teeth of the drive means, and a reliable and accurate meshing engagement is obtained.

The novel features which are considered as characteristic for the invention are set forth in particular in the appended claims. The invention itself, however, both as to its construction and its method of operation, together with additional objects and advantages thereof, will be best understood from the following description of specific embodiments when read in connection wiht the accompanying drawings, in which:

Figure 1:
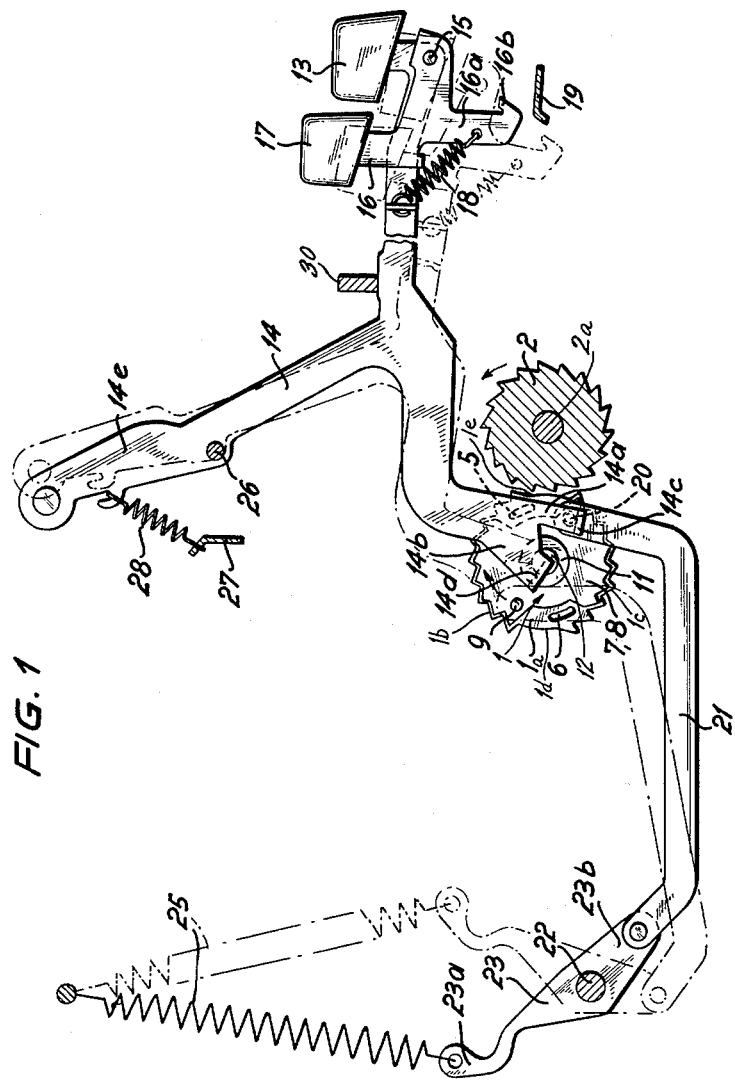
FIG. 1 is a fragmentary side view illustrating a coupling arrangement according to one embodiment of the present invention as incorporated into an electric typewriter.

Referring now to the drawings, and more particularly to FIG. 1, a drive means 2 includes a shaft 2a and a cylindrical power roll provided with a set of longitudinally extending peripheral teeth. Shaft 2a is turnably mounted in the frame of an electric typewriter, not shown, means are provided for continuously rotating the drive means 2 during operation of the typewriter.

Figure 2:
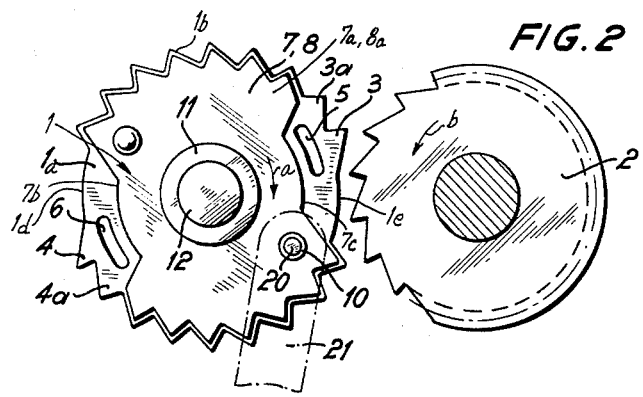
FIG. 2 is a fragmentary side view, partly in section, illustrating on an enlarged scale an inoperative position of the coupling arrangement.
Figure 3:
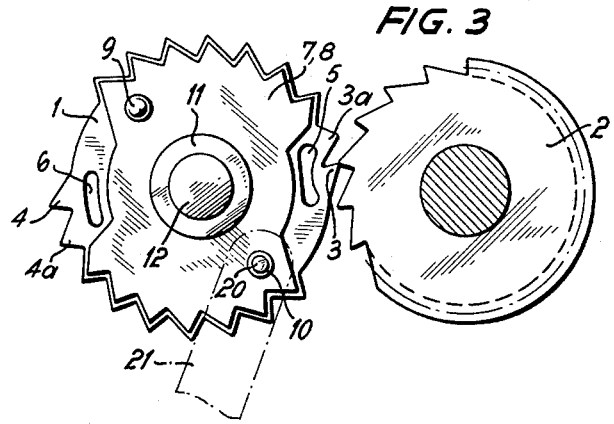
FIG. 3 is a fragmentary side view, partly in section, corresponding to FIG. 2 but illustrating another position of the coupling arrangement.

A driven means 1, which is shown on an enlarged scale in FIGS. 2 and 3, comprises an inner disc 1a which consists of a flexible and resiliently deformable material and has a peripheral annular portion including two groups of teeth 1b and 1c, which are separated from each other by recessed portions 1d and 1e, which are angularly spaced 180°.

As best seen in FIG. 2, a pair of teeth 3, 3a follows recess 1e in the direction of rotation indicated by the arrow a and a pair of teeth 4, and 4a follows recess 1d in the direction of rotation. Inwardly of each pair of teeth 3, 3a and 4, 4a, cutouts 5 and 6 are provided in the flexible disc 1a. The cutouts 5 and 6 have the form of part-circular slots extending substantially parallel to the periphery of disc 1a. Two metal plates 7 and 8 are located on opposite sides of disc 1a, and are secured to the same by rivets 9 and 10 passing through aligned bores in members 7, 1a, and 8.

Metal plates 7 and 8 have a shape corresponding to the peripheral contour of disc 1a, and are provided with teeth 7a, 8a which register with corresponding teeth 1b, 1c and whose edges are located inwardly of the edges of teeth 1b and 1c and extend substantially parallel to the same. Metal plates 7 and 8 have recesses 7b and 7c arranged in the region of recesses 1d and 1e, and of cutouts 5 and 6, so that cutouts 5 and 6, and the pairs of teeth 3, 3a and 4, 4a are not covered by metal plates 7 and 8. A flanged bushing 11 connects plates 7 and 8 and serves as a bushing into which the free end of a shaft 12 projects.

Figure 4:
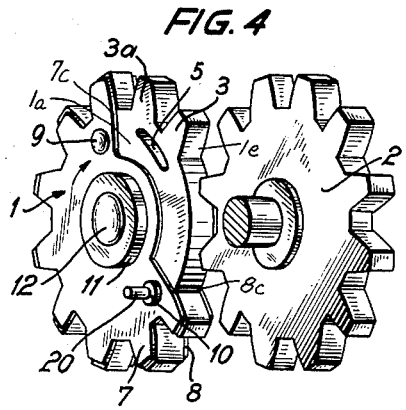
FIG. 4 is a fragmentary perspective view illustrating the main parts of a coupling arrangement according to a modified embodiment of the invention.

The embodiment of FIG. 4 is similar to the embodiment of FIGS. 1, 2 and 3, but has only a single recess 1e followed by a pair of resilient teeth, 3 and 3a, a single cutout 5, a single recess 7c in plate 7, and a single recess 8c in plate 8.

As very clearly shown in FIG. 4, a pivot pin 20 projects from the rivet means 10, and a corresponding pivot pin 20 is supported by the rivet means 10 in the embodiment of FIGS. 1, 2 and 3. A link 21 is turnably mounted on pivot pin 20.

As shown in FIG. 1, link member 21 is articulated to one arm 23b of a double-armed lever 23 which is turnably mounted on a shaft 22 and has another arm 23a which is connected by spring 25 to a preferably turnable stud 24 on the frame of the machine. When driven means 1 is turned through 180° from the position shown in FIG. 1, pivot pin 20 and the end of link 21 will be located in the place in which rivet 9 is shown, and consequently lever 23 will have turned in clockwise direction about the fulcrum 22 to another end position in which the spring 25 has passed over the dead center position of arm 23a.

A manually operated key 13 operates a lever 14 which turnably carries a member 16 with a locking key 17. Lever 14 is turnably mounted on a fulcrum 26, and when either key 13 or key 17 is depressed, lever 14 turns in clockwise direction about fulcrum 26. When locking key 17 is used for this operation, the catch projection 16b on arm 16a will snap over the locking projection 19 and will hold lever 14 in a turned position until key 13 is depressed and permits spring 18 to release the locking means 16b, 19. If key 13 is operated at the beginning of an operation, lever 14 also turns in clockwise direction against the action of spring 28, which is secured to a bracket 27, but lever 14 is not locked so that spring 28 returns lever 14 in counter-clockwise direction into the initial position abutting a stop 30 when key 13 is released by the operator.

Keys 13 and 17, control, for example, the shifting of the type lever support between a lower case position and an upper case position, the type lever support being operatively connected to the driven means 1 so that the type levers are shifted when driven means 1 performs a single revolution. Lever 14 has a portion with two arms 14a and 14b terminating in transverse abutments 14c and 14d which are located in the circular path of movement of the stop pin 20. In the position of FIG. 1, spring 25 acts on the link 21 through lever 23 to turn driven means 1 in clockwise direction, but since stop 20 abuts on abutment 14c, neither driven means 1 nor lever 23 can turn. When either key 13 or key 17 is depressed and actuated, lever 14 turns to a position in which abutment 14c releases stop 20, and in which abutment 14d is located in the circular path along which stop 20 moves during rotation of driven means 1. Upon return of key 13 to its initial normal position, spring 28 will turn lever 14 to the illustrated position so that abutment 14c is located in the path of movement of stop 20 during rotation of the driven means 1.

Stop 20 cooperates with the upper face of abutment 14c and with the lower face of abutment 14d. These faces are arranged in such a manner that driven means 1 will have turned 180° when stop 20 has moved from the illustrated position to a position abutting the lower face of abutment 14d in the actuated position of key 13 and lever 14.

The device operates in the following manner: The normal position of the coupling arrangement is shown in FIGS. 1 and 2 which clearly show that the teeth of the drive means 2 are located in the recess 1e of disc 1a so that drive means 2 can continuously rotate without influencing driven means 1 in any way. However, when either key 13 or key 17 is depressed, lever 14 is turned in clockwise direction, and abutment 14c moves away from stop 20 so that driven means 1 is no longer blocked and can be slightly turned by link 21 under the action of lever 23 and spring 25 which urges lever 23 to turn to an over center position. The slight turning movement of driven means 1 normally places tooth 3 in the path of the teeth of drive means 2 so that driven means 1 is rotated through an angle of 180° until stop 20 abuts the lower face of abutment 14d which is located in the rotary path of movement of stop 20 as long as key 13 is held depressed or key 17 is locked by locking means 16b, 19. The turning of driven means 1 through 180° effects, for example, raising of the support of the type levers to the upper case position. When locking means 16b is released by operation of key 13, or if key 13 is released by the operator, spring 28 turns lever 14 in counter-clockwise direction back to the illustrated position so that the lower face of abutment 14d releases stop 20. Since lever 23 has passed its dead center position during the turning of driven means 1 through 180°, spring 25 now urges lever 23 to turn in counter-clockwise direction so that link 21 slightly turns driven means 1 out of the position in which recess 1d is located opposite drive means 2 and to a position in which tooth 4 is engaged by the teeth of drive means 2 so that driven means 1 is rotated through 180° until the initial position of FIGS. 1 and 2 is again obtained. When after a turning movement through 180° of the driven means 1, the teeth of the drive means are again located in a recess 1d or 1e, the inertia of the driven means 1 is sufficient to complete the turning through 180° until stop 20 abuts either abutment 14c or abutment 14d.

If, for some reason excess pressure is exerted under unusual circumstances on the teeth 1b or 1c of the flexible resilient disc 1a, these teeth are deformed until the teeth of drive means 2 engage the flanks of the smaller teeth 7a, 8a of plates 7 and 8 in meshing engagement. Consequently, the operation is quiet under normal conditions where the elastic teeth 1b, 1c of disc 1a are engaged, but a rigid positive meshing is possible, when required by particular operational conditions.

In the event that in the moment in which driven means 1 is slightly turned to a position coupled with drive means 2, the teeth of drive means 2 and of driven means 1 happen to be in a position in which the tip of tooth 3 or of tooth 4 abuts a tip of a tooth of drive means 2, as shown in FIG. 3, a meshing engagement between the drive means and the driven means could not be obtained if teeth 3 and 4 were rigid. However, in accordance with the present invention, teeth 3, 3a and 4, 4a are resiliently deformable, particularly due to the provision of cutouts 5 and 6, so that if the tip of tooth 3, or of tooth 4, is engaged by a tip of a tooth of drive means 2 in the position of FIG. 3, tooth 3 yields inwardly forming a bulge in cutout 5, while simultaneously effecting a resilient deformation of the adjacent following tooth 3a so that the tip of the same is slightly displaced and is no longer located in a position in which it would be engaged by the tip of the next following tooth of drive means 2. Consequently, tooth 3a passes into the notch between two adjacent teeth of drive means 2, and the desired accurate meshing engagement between drive means 2 and driven means 1 is reliably obtained.

The embodiment of FIG. 4 operates substantially in the same manner as the embodiment of FIGS. 1 to 3. In the inoperative position of the coupling arrangement shown in FIG. 4, the teeth of drive means 2 move in the recess 1e, and cannot turn driven means 1. When driven means 1 is slightly turned by an operating means, not shown in FIG. 4, acting on pin 20, tooth 3 moves to a position in which it can be engaged by the teeth of the rotating drive means 2 so that driven means 1 is turned one revolution until recess 1e again arrives in the position shown in FIG. 4. The last part of the motion to the initial position of driven means 1 is obtained by inertia so that driven means 1 can be stopped as described with reference to FIG. 1, but after turning through 360°. Driven means 1 is spring-loaded to turn in clockwise direction and an abutment corresponding to abutment 14c blocks turning movement of driven means 1 by engaging stop 20. When the abutment is displaced by operation of a key, as described with reference to FIG. 1, the spring slightly turns driven means 1 until drive means 2 engages tooth 3 and driven means performs a single revolution and is stopped if the abutment has been returned to the stop position located in the path of stop 20, which is accomplished by release of the control key.

It will be understood that each of the elements described above, or two or more together, may also find a useful application in other types of rotary coupling arrangements differing from the type described above.

While the invention has been illustrated and described as embodied in a rotary coupling arrangement including a member having resilient deformable teeth, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitutes essential characteristics of the generic or specific aspects of this invention and, therefore, such adaptations should and are intended to be comprehended within the meaning and range of equivalence of the following claims.

What is claimed as new and desired to be secured by Letters Patent is:

1. A rotary coupling arrangement comprising, in combination, a rotary drive means having an axis of rotation and an annular peripheral set of first teeth; a rotary driven means including a member having an axis of rotation and an annular peripheral portion located opposite said set of first teeth and including a set of flexible second teeth and recessed means so that said set of second teeth is interrupted, said axes being spaced from each other such a distance that in an inoperative angular position of said driven means said first teeth are located in said recessed means without meshing with said second teeth so that said driven means is not coupled to said drive means while in other angular positions said second teeth mesh with said first teeth and said driven means is coupled to and rotated by said drive means, said driven means including two plates fixed to opposite sides of said member and having rigid teeth respectively located on said second teeth, and having edges located inwardly of the edges of said second teeth and extending substantially parallel to the same so that said first teeth mesh with said teeth of said plates when said second teeth of said member are substantially deformed by excess pressure between said first and second teeth; and operating means for turning said driven means out of said inoperative position so that said drive means rotates said driven means until said first teeth are located in said recessed means whereby said driven means cannot turn more than a single revolution.

2. A rotary coupling arrangement comprising, in combination, a rotary first gear means having an axis of rotation and an annular peripheral set of first teeth; a rotary second gear means having an axis of rotation and an annular peripheral portion located opposite said set of first teeth and including a set of second teeth and recessed means so that said set of second teeth is interrupted, said axes being spaced from each other such a distance that in an inoperative angular position of said second gear means said first teeth are located in said recessed means without meshing with said second teeth so that said second gear means is not coupled to said first gear means while in other angular positions said second teeth mesh with said first teeth and said second gear means is adapted to turn in one direction of rotation, at least the two second teeth directly following said recessed means in said direction of rotation being flexible and together deformable so that the trailing tooth of said two second teeth are displaced to a position engaging a notch between two first teeth when the tip of the leading tooth of said two second teeth is engaged by the tip of a first tooth and said leading tooth is deformed; and operating means for turning said second gear means out of said inoperative position.

3. A rotary coupling arrangement comprising, in combination, a rotary drive means having an axis of rotation and an annular peripheral set of first teeth; a rotary driven means having an axis of rotation and an annular peripheral portion located opposite said set of first teeth and including a set of second teeth and recessed means so that said set of second teeth is interrupted, said axes being spaced from each other such a distance that in an inoperative position of said driven means said first teeth are located in said recessed means without meshing with said second teeth so that said driven means is not coupled to said drive means while in other angular positions said second teeth mesh with said first teeth and said driven means is coupled to and rotated by said drive means in one direction of rotation, at least the first two second teeth directly following said recessed means in said direction of rotation being flexible, said driven means being formed with at least one cutout inwardly of said peripheral portion thereof and extending at least under the second tooth directly following said recessed means so that the same yields inwardly when its tip is engaged by the tip of a tooth of said first set of teeth and effects displacement of the next following second tooth so that the last-mentioned second tooth passes into a notch between two first teeth and is reliably engaged by said first teeth; and operating means for turning said driven means in said direction of rotation out of said inoperative position so that said drive means rotates said driven means until said first teeth are located in said recessed means whereby said driven means cannot turn more than a single revolution.

4. A rotary coupling arrangement comprising, in combination, a rotary drive means having an axis of rotation and an annular peripheral set of first teeth; a rotary driven means having an axis of rotation, said driven means including a disk consisting of flexible resilient material and having an annular peripheral portion located opposite said set of first teeth and including a set of resiliently deformable second teeth and recessed means so that said set of second teeth is interrupted, said axes being spaced from each other such a distance that in an inoperative angular position of said driven means said first teeth are located in said recessed means without meshing with said second teeth so that said driven means is not coupled to said drive means while in other angular positions said second teeth mesh with said first teeth and said driven means is coupled to and rotated by said drive means in one direction of rotation, said driven means being formed with at least one cut out inwardly of said peripheral portion thereof and extending under the first two second teeth directly following said recessed means in said direction of rotation so that the second tooth directly following said recessed means yields inwardly when its tip is engaged by the tip of a tooth of said first set of teeth and effects deformation of the next following second tooth in outward direction so that the last-mentioned second tooth is reliably engaged by said first teeth; and operating means for turning said driven means in said direction of rotation out of said inoperative position so that said drive means rotates said driven means until said first teeth are located in said recessed means whereby said driven means cannot turn more than a single revolution.

5. A coupling arrangement as set forth in claim 4, wherein said driven means includes two rigid metal plates on opposite sides of said disk and fixedly secured to the same, said plates having teeth located on said second teeth, and having edges located inwardly of the edges of said second teeth and extending substantially parallel to the same so that said first teeth mesh with said teeth of said plates when said second teeth of said disk are substantially deformed by excess pressure between said first and second teeth.

6. A rotary coupling arrangement comprising, in combination, a rotary drive means having an axis of rotation and an annular peripheral set of first teeth; a rotary driven means having an axis of rotation and an annular peripheral portion located opposite said set of first teeth and including a set of second teeth and two recesses angularly spaced 180° so that said set of second teeth is interrupted, said axes being spaced from each other such a distance that in two inoperative angular positions of said driven means said first teeth are located in said recesses, respectively, without meshing with said second teeth so that said driven means is not coupled to said drive means while in other angular positions said second teeth mesh with said first teeth and said driven means is coupled to and rotated by said drive means; and operating means for turning said driven means out of any one of said inoperative positions in which said first teeth are located in one of said recesses so that said drive means rotates said driven means until said first teeth are located in the respective other recess whereby said driven means cannot turn more than a single revolution.

7. A rotary coupling arrangement comprising, in combination, a rotary drive means having an axis of rotation and an annular peripheral set of first teeth; a rotary driven means having an axis of rotation and an annular peripheral portion located opposite said set of first teeth and including a set of second teeth and two recesses angularly spaced 180° so that said set of second teeth is interrupted, said axes being spaced from each other such a distance that in two inoperative angular positions of said driven means said first teeth are located in said recesses, respectively, without meshing with said second teeth so that said driven means is not coupled to said drive means while in other angular positions said second teeth mesh with said first teeth and said driven means is coupled to and rotated by said drive means in one direction of rotation, at least the pairs of second teeth directly following said recesses in said direction of rotation being flexible and resiliently deformable, said driven means being formed with two cutouts inwardly of said peripheral portion thereof and extending under said pairs of second teeth so that either second tooth directly following one of said recesses yields inwardly when its tip is engaged by the tip of a first tooth of said set of first teeth and effects deformation of the next following tooth of the respective pair of second teeth in outward direction so that the same is reliably engaged by said first teeth; and operating means for turning said driven means out of any one of said inoperative positions in which said first teeth are located in one of said recesses so that said drive means rotates said driven means until said first teeth are located in the respective other recess whereby said driven means cannot turn more than a single revolution.

8. A coupling arrangement as set forth in claim 7 wherein said operating means includes a lever, a spring connected to said lever so that the same is turnable between two end positions in which said lever is spring-loaded and biased to turn in opposite directions, respectively, to an intermediate dead-center position in which said lever is not biased by said spring, a link articulated to said lever and to an eccentric point of said driven means and arranged and constructed in such a manner that said driven means is in one of said inoperative positions when said lever is in one of said spring-loaded end positions, and manually operated means for holding said driven means in said inoperative positions.

9. A coupling arrangement as set forth in claim 8 wherein said driven means has two stops angularly spaced 180°; and wherein said manually operated means includes a manually operated key, having a normal position and an actuated position, an actuating member operated by said key and having two abutments, one of said abutments being located in the circular path of movement one of said stops where said key is in said normal position and releasing said one stop in said actuated position of said key, and the other abutment being located in the circular path of movement of the other stop in said actuated position of said key, and releasing said other stop in said normal position of said key.

10. A coupling arrangement as set forth in claim 7, wherein said driven means includes a resilient disc having said second teeth, said recesses, and said cutouts.

11. A coupling arrangement as set forth in claim 10, wherein said driven means includes two rigid metal plates on opposite sides of said resilient disc and fixedly secured to the same, said plates having teeth located on said second teeth and having edges located inwardly of the edges of the second teeth and extending substantially parallel to the same, so that said first teeth mesh with said teeth of said plates when said second teeth of said disc are substantially deformed by excess pressure between said first and second teeth, each plate being formed with two recesses, located in the region of said recesses, cutouts, and pairs of second teeth of said resilient disc, so as to permit deformation of said pairs of second teeth.

12. A coupling arrangement as set forth in claim 10, wherein said cutouts in said resilient disc are slots extending substantially parallel to the periphery of said resilient disc.

13. A coupling arrangement as set forth in claim 7, wherein said driven means has an eccentric stop projecting therefrom; biasing means operatively connected to said driven means and tending to turn the same in the direction of rotation out of said inoperative position; and a manually operated means movable between a normal position and an actuated position and engaging said stop in one of said inoperative positions of said driven member in said normal position thereof, and engaging said stop in the other inoperative position of said driven member when in said actuated position for blocking turning movement of said driven member under the action of said biasing means until the position of said manually operated means is changed by an operator.

14. A coupling arrangement as set forth in claim 13, wherein said driven means includes a resilient disc having said second teeth, said cutouts, and said recesses, a pair of rigid plates on opposite sides of said resilient disc and having recesses in the region of said cutouts, recesses, and pairs of second teeth of said resilient disc; and wherein said plates and said disc are connected by rivet means, one of said rivet means having an extension constituting said projecting stop of said rivet means.

15. A coupling arrangement as set forth in claim 14, wherein said biasing means includes a link articulated on said stop of said rivet means.

16. A gear comprising a first member having flexible teeth, and a second member fixedly and rigidly secured to said first member for movement therewith and having rigid teeth respectively registering with said flexible teeth and flanks and tips located inwardly of the flanks and tips of the respective flexible teeth so that said rigid teeth are normally inoperative during meshing engagement between said flexible teeth with the teeth of another gear but mesh with the teeth of the other gear when said flexible teeth are deformed to such an extent that the flanks thereof register with the flanks of said rigid teeth.

17. A coupling arrangement as set forth in claim 3 wherein said cutout extends under said two second teeth.

18. A gear arrangement comprising, in combination, a first gear having a set of first teeth; a second gear having a set of second teeth; and operating means for moving one of said gears to a position adapted to mesh with the other gear so that the teeth of each gear normally engage the notches between the teeth of the other gear but in certain relative positions of said gears the tips of the teeth of said first and second gears engage each other and prevent meshing, successive teeth of said second gear being flexible and together deformable in such a manner that a trailing flexible second tooth is displaced to a position engaging a notch between two first teeth when the tip of the respective leading second tooth is engaged by the tip of a first tooth and said leading flexible second tooth is deformed.

19. A gear arrangement comprising, in combination, a first gear having a set of first teeth; a second gear having a set of second teeth; and operating means for moving one of said gears to a position adapted to mesh with the other gear so that the teeth of each gear normally engage the notches between the teeth of the other gear but in certain relative positions of said gears the tips of the teeth of said first and second gears engage each other and prevent meshing, successive teeth of said second gear being flexible and together deformable in such a manner that a trailing flexible second tooth is displaced to a position engaging a notch between two first teeth when the tip of the respective leading second tooth is engaged by the tip of a first tooth and said leading flexible second tooth is deformed, said second gear being formed with cutouts located inwardly of said second teeth to facilitate the displacement of said trailing second tooth.

References Cited by the Examiner
UNITED STATES PATENTS

| | | | |
|---|---|---|---|
| 820,789 | 5/06 | Hutchins | 74—461 |
| 2,449,852 | 9/48 | Jones | 74—435 |
| 2,572,334 | 10/51 | Guibert | 74—461 |
| 2,931,481 | 4/60 | Salto | 197—17 |
| 2,945,577 | 7/60 | Frechette | 197—17 |

DON A. WAITE, *Primary Examiner.*

BROUGHTON G. DURHAM, *Examiner.*